United States Patent [19]

Parshall

[11] Patent Number: 4,738,777
[45] Date of Patent: Apr. 19, 1988

[54] PRESSURE FILTER MEDIA MOUNTING ASSEMBLY

[75] Inventor: David G. Parshall, Northville, Mich.

[73] Assignee: AMSTED Industries Incorporated, Chicago, Ill.

[21] Appl. No.: 873,362

[22] Filed: Jun. 12, 1986

[51] Int. Cl.$^4$ .............................................. B01D 29/14
[52] U.S. Cl. ..................... 210/232; 100/130; 100/211; 210/416.1; 210/450; 210/455; 210/485
[58] Field of Search ............... 100/110, 112, 122, 126, 100/130, 123, 211, 298; 210/350, 351, 354, 355, 356, 358, 391, 394, 396, 398, 402, 403, 407, 413, 416.1, 455, 485, 224, 225, 232, 450, 451

[56] References Cited

U.S. PATENT DOCUMENTS

| | | | |
|---|---|---|---|
| 3,276,594 | 10/1966 | Gwilliam | 210/350 |
| 4,507,201 | 3/1985 | Wall et al. | 100/211 X |
| 4,622,144 | 11/1986 | Janecek et al. | 210/351 |

Primary Examiner—Richard V. Fisher
Assistant Examiner—W. Gary Jones
Attorney, Agent, or Firm—Edward J. Brosius; Charles E. Bouton

[57] ABSTRACT

A pressure filter apparatus with media mounting assemblies is provided. The pressure filter tank is generally cylindrical with a cylindrical inner wall having a filter screen therein. A filter media is mounted on the inner wall with seal assemblies above and below the filter screen. Each seal assembly includes a spacer rod and bar continuously welded to the inner wall of the filter and a resilient ring mounted thereon. Each upper and lower edge of the media is sewn to the resilient ring to form a seal therewith.

15 Claims, 2 Drawing Sheets

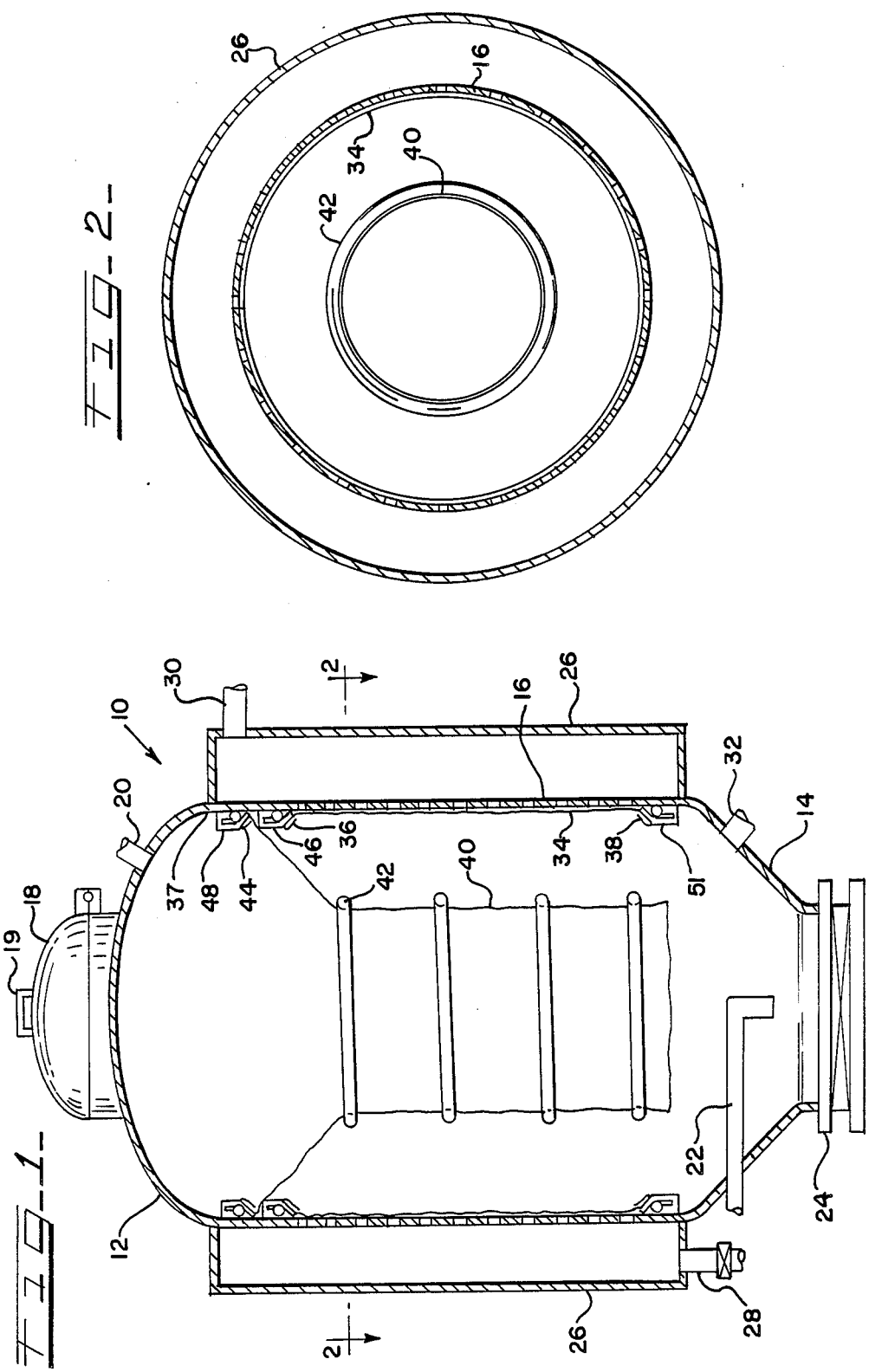

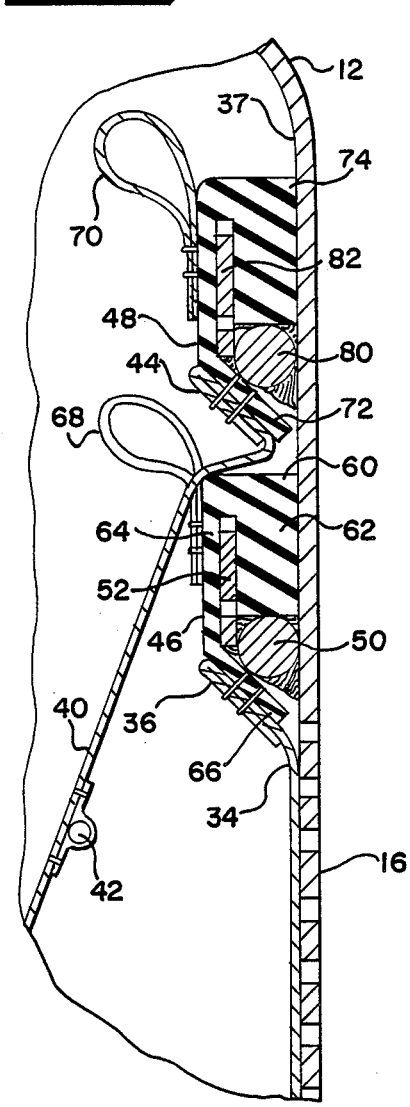
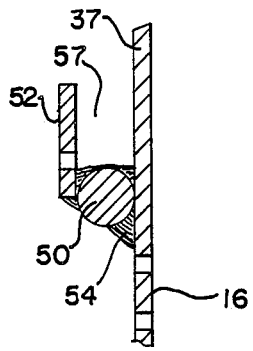
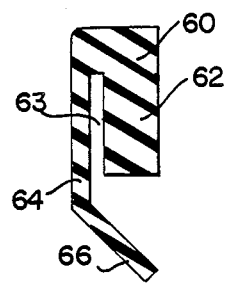
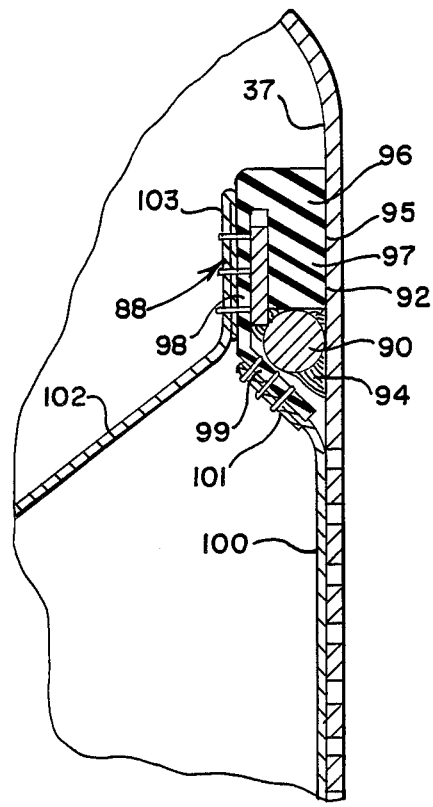

PRESSURE FILTER MEDIA MOUNTING ASSEMBLY

BACKGROUND OF THE INVENTION

The present invention relates to a pressure filter apparatus and, more particularly, to a filter media mounting assembly in a pressure filter.

In the type of pressure filter to which the present invention relates, a filter vessel is provided having a top cap structure and a bottom valve structure joined by a porous filter screen, generally cylindrical in structure. Liquid to be filtered usually containing suspended solids is inlet into the vessel and allowed to rise to a desired height. The vessel is pressurized to force the liquid through the filter screen. Upon cessation of liquid flow into the vessel, the pressurization is continued to force the liquid through the filter screen and, accordingly, the liquid level drops in the vessel. The filtered liquid is discharged from a cavity surrounding the filter screen. The buildup of suspended solids on the filter screen, which can form a cake hardened by the pressurization within the vessel, is broken from the filter screen by one or more methods and released from the vessel through the bottom valve structure.

Frequently it is desirable to affix a filter media sleeve inside the filter screen to assist in filtering the liquid. The filter media most often comprises a cylindrical sleeve fitted within the filter vessel adjacent the inside edge of the filter screen. Various methods were used to seal such media to the inside wall of the vessel, none of which has yet proved entirely satisfactory. One method is to utilize two rigid metal hoops of a diameter nearly equal to that of the filter vessel. Such hoops are bolted together with one edge of the media therebetween. This arrangement has not provided a liquid tight seal between the filter media and the inside wall of the vessel, which is necessary to assure that no liquid to be filtered can bypass the filter media. Further, such metal hoops are awkward and heavy, making the installation and removal of the media difficult. The hoops, because of their diameter nearly equal to that of the filter vessel, also require a hatch in the top section of the vessel of the full diameter of the vessel to permit installation and removal of the hoop and media. Such a hatch is expensive and quite heavy, usually requiring a crane to open.

SUMMARY OF THE INVENTION

It is an object of the present invention to provide an improved pressure filter media mounting assembly.

A seal assembly is provided for the top and bottom edges of the filter media wherein such edges are held to the inside wall of the filter vessel in a liquid tight manner. A troughlike groove or pocket is formed around the inside wall of the filter vessel both above and below the filter screen. Such pocket is typically formed by a spacer rod being welded to the inside wall in a continuous sealed manner and a bar extending from the spacer rod to form a pocket. A resilient ring made of rubber, neoprene, buna-N or similar materials or appropriately chosen resilient elastomers is provided having a first portion adapted to fit within the pocket. A second portion of the ring extends outside the bar and has an end portion onto which the top edge of the filter media is glued or stitched. The second portion of the ring also seals against the spacer rod. A similar pocket and resilient seal is provided at the bottom edge of the filter media thereby assuring a liquid tight seal of the filter media against the vessel inner wall.

In alternate embodiments of the present invention, a compression membrane can be provided. Such compression membrane is generally cylindrical and has an upper edge affixed to a seal assembly similar to those described above located on the inner wall of the filter vessel above the upper media seal and has an open bottom edge. Alternatively, the upper edge of the compression membrane can be glued or stitched to the second portion of the upper filter media seal assembly ring. The compression membrane is utilized during the pressurization of the filter vessel whereupon the compression membrane is forced against the filter media to assist in pressing the accumulated solids against the filter media to assure the thorough forcing of liquid therethrough and forming of a relatively dry cake thereon.

The flexible, resilient seal rings of the filter media and compression membrane aid in the easy installation and replaceability of the media and the membrane due to the light weight of the rings and their deformability. Such seal rings may be folded prior to installation and readily pass through a less than full size hatch on top of the filter top section. The media sleeve is installed first within the filter vessel, followed by the compression membrane. In the alternate embodiment, both media and membrane are installed or removed in one operation.

BRIEF DESCRIPTION OF THE DRAWINGS

In the drawings,

FIG. 1 is a side view in cross section of a filter device in accordance with an embodiment of the present invention;

FIG. 2 is a top view in cross section along lines 2—2 of FIG. 1;

FIG. 3 is a detailed cross sectional view of a seal assembly in accordance with an embodiment of the present invention;

FIG. 4 is a detailed cross sectional view of a pocket assembly in accordance with an embodiment of the present invention;

FIG. 5 is a detailed cross sectional view of a seal ring in accordance with an embodiment of the present invention; and FIG. 6 is a detailed cross sectional view of a second embodiment of a seal assembly in accordance with the present invention.

DETAILED DESCRIPTION OF THE INVENTION

Referring now to FIGS. 1 and 2 of the drawings, a filter vessel is shown generally at 10 having upper section 12 of a generally cylindrical cap shape and lower section 14 of a generally cylindrical funnel shape. Cylindrical filter screen 16 joins upper section 12 and lower section 14. A hatch 18 is fitted to upper section 12 and is of a diameter less than the full diameter of filter vessel 10. In most embodiments of the present invention filter, hatch 18 is of a size and weight such that it can be opened by a man pulling on handle 19. Appropriate hinge and locking mechanisms for the hatch and a seal to insure the air tightness of the hatch are all provided, but none of which are part of the present invention. A source of compressed air (not shown) is connected to air inlet 20 in upper section 12.

Liquid to be filtered is inlet to filter vessel 10 through pipe 22 which discharges such liquid near lower section 14. A valve structure 24 is provided at the bottom of lower section 14. Valve structure 24 is closed during normal filtration, and is usually only opened to provide a discharge path for solids which accumulate on filter screen 16.

An annular casing 26 is formed around filter screen 16 to collect filtered liquid passing through filter screen 16. Lower outlet valve 28 in casing 26 is normally closed during filtration and pressurization, and is only opened when it is desired to drain casing 26. Typically, filtered liquid passing through filter screen 16 rises in casing 26 to the height of outlet 30 before exiting casing 26. This raised outlet 30 assures that the solids filtered from the liquid accumulate evenly on the inner side of filter screen 16.

A cylindrical filter media 34 of a woven material or an unwoven paper material is affixed to filter vessel 10 inside filter screen 16. Top edge 36 of filter media 34 is supported from upper seal assembly 46 and bottom edge 38 of filter media 34 is affixed to lower seal assembly 50. The contact between filter media 34 top and bottom edges and their respective seal assemblies is water tight to assure that all liquid to be filtered must pass through filter media 34 prior to entering casing 26.

Generally cylindrical compression membrane 40 is supported along its upper edge 44 by seal assembly 48 which is affixed to the inner wall of filter vessel 10. Elastic bands 42 are affixed around the lower portion of compression membrane 40. Such bands hold compression membrane 40 within a diameter less than filter vessel 10 under normal filtering conditions. However, when air pressure is supplied through inlet 20, compression membrane 40 is expanded as are bands 42 such that compression membrane presses the accumulated solids against filter media 34. Upon the release of such pressurization, elastic bands 42 act to withdraw compression membrane 40 to its lesser diameter.

Hand openings 32 have caps that are removable to enable individual's hands to enter the lower section 14 of filter vessel 10 to assist in positioning lower seal assembly 50.

Referring now to FIGS. 3–5, details of seal assemblies 46 and 48 are shown. Seal assembly 46 includes a spacer rod 50 which is continuously welded at 54 around the interior of inner wall 37 of filter vessel 10. A continuous seal is formed around the interior wall with rod 50. Bar 52 is welded to rod 50 and extends around the interior of inner wall 37 of filter vessel 10 forming a pocket 57 between bar 52 and inner wall 37.

Resilient ring 60 is formed of a rubber material such as buna-N or neoprene or an appropriately chosen elastomer. Ring 60 includes main section 62 of a radial width about equal to the radial width of pocket 57. A side portion 64 extends downwardly from the top of main section 62, leaving a gap 63 therebetween adapted to receive bar 52. End section 66 extends from side portion 64 at an angle of about 45°. Main section 62 abuts rod 50 causing a seal thereagainst. Folded top edge 36 of filter media 34 is sewn to end section 66 such that seal assembly 46 forms a water tight seal therebetween and for seal assembly 46 against inner wall 37. The filter media is sealed to end portion 66 of the seal. The bottom of main section 62 is the seal between the seal assembly 46 and the side wall 37. Finger loops 68 can be sewn to side portion 64 to aid in removal of seal assembly 46.

Seal assembly 48 is similar to seal assembly 46, with the only difference being that the upper folded edge 44 of compression membrane 40 is glued and sewn to end section 72 of resilient ring 74 to insure an airtight seal. Spacer rod 80 and bar 82 are affixed to inner wall 37 and each other in a similar manner as rod 50 and bar 52. Ring 74 is similar to ring 60, forms a similar seal with rod 80 and bar 82, and includes handles or finger loops 70 to aid in removal of seal assembly 48 and membrane 40. Due to the flexibility of rings 60 and 74, both seal assemblies 46 and 48, with attached media 34 and membrane 40, respectively, can be removed through hatch 18.

Bottom seal assembly 51 is similar to upper seal assembly 46 in every respect, except being in an upside down relation thereto. The lower folded edge 38 of media 34 is sewn to a resilient ring portion of bottom seal assembly 51.

Referring now to FIG. 6, a second embodiment of a seal assembly of the present invention is shown generally at 88. Spacer rod 90 is welded continuously to inner wall 37 of filter vessel 10, with bar 92 being welded to rod 90 so as to form pocket 95 between inner wall 37 and bar 92. Resilient ring 96 includes a main section fitted in pocket 95, a side section 98 extending downwardly from main section 97 and end section 99 extending at an angle of about 45° from side section 98. Folded top edge 101 of filter media 100 is sewn to end section 99 of ring 96 to form a watertight seal therebetween. This assures that any liquid being filtered must pass through filter media 100. Further, upper folded edge 103 of membrane 102 is glued and sewn to side section 98 of ring 96. This forms an airtight seal therebetween such that when the upper section of filter vessel 10 is pressurized, membrane 102 will expand against filter media 100.

Referring again to FIG. 1, a general operation of the filter will now be described. Liquid to be filtered is inlet through pipe 22 and rises to near the upper edge of media 34. Filtered liquid passing through filter media 34 and screen 16 enters casing 26 to rise to outlet 30. This assures even depositing of filtered solids on the inner surface of media 34. When it is desired to compress the accumulated solids against media 34, air pressure is inlet at 20 to expand membrane 40 against media 34. The flow of liquid to be filtered is stopped from pipe 22, and membrane 40 forces the remaining liquid through media 34. The air pressure is cut off and membrane returns to the contracted form shown in FIG. 1 due to elastic bands 42 pulling membrane 40 inwardly. Drain 28 can be opened to let out filtered liquid from casing 26.

If it is desired to replace media 34 and membrane 40, hatch 18 can be opened allowing access to the inside of filter vessel 10. Using the finger loops 20 shown in FIG. 3, ring 74 can be pulled out through hatch 19 along with membrane 40 due to the flexibility of ring 74. Similarly ring 60 can be pulled out with media 34 using finger loops 68 after reaching through handholes 32 to disengage the lower seal assembly ring from its associated spacer rod and bar assembly (not shown). New media and membrane can be installed in reverse order.

What is claimed is:
1. A filter apparatus comprising
  a filter vessel having a top section and a bottom section and a generally cylindrical filter screen joining said top and bottom sections,
  a discharge valve in said bottom section,
  a generally cylindrical filter media adjacent said filter screen inside said filter vessel, an upper seal assembly joining an upper edge of said filter media to an upper adaptor assembly near the top section of said filter vessel, a lower seal assembly joining a lower edge of said filter media to a lower adaptor assembly near the bottom section of said filter vessel, said upper adaptor assembly including an upper spacer means adjacent to the inner wall of said filter vessel and an upper bar means extending upwardly from said upper spacer means to form an upper pocket between said upper bar means and the inner wall of said filter vessel around the inner circumference of said filter vessel, and said upper seal assembly comprises a resilient elastomer ring having a first portion adapted to extend downwardly into said upper pocket, a side portion extending downwardly from said first portion and located adjacent the inside edge of said upper bar means, and a lower portion extending at an angle from said side portion and located adjacent a lower edge of said upper spacer means, and the upper edge of said filter media is attached to said lower portion of said elastomer ring to form a liquid tight seal therewith.

2. The filter apparatus of claim 1 wherein said lower adaptor assembly includes a lower spacer means adjacent to the inner wall of said filter vessel and a lower bar means extending downwardly from said lower spacer means to form a lower pocket between said lower spacer means and the inner wall of said filter vessel around the inner circumference of said filter vessel.

3. The filter apparatus of claim 1 wherein said upper spacer means is welded to the inner wall of said filter vessel to form a continuous seal between the upper spacer means and the inner wall of the filter vessel.

4. The filter apparatus of claim 2 wherein said lower seal assembly comprises a resilient elastomer ring having a first portion adapted to extend upwardly into said lower pocket, a side portion extending upwardly from said first portion and located adjacent the inside edge of said lower bar means, and an upper portion extending at an angle from said side portion and located adjacent an upper edge of said lower spacer means.

5. The filter apparatus of claim 4 wherein the lower edge of said filter media is attached to the upper portion of said elastomer ring to form a liquid tight seal therewith.

6. The filter apparatus of claim 2 wherein said lower spacer means is welded to the inner wall of said filter vessel to form a continuous seal between the lower spacer means and the inner wall of the filter vessel.

7. The filter apparatus of claim 1 further including a generally cylindrical impervious membrane within said filter vessel, a second upper seal assembly joining an upper edge of said membrane to a second upper adapter assembly above the upper adapter assembly.

8. The filter apparatus of claim 7 wherein said second upper adapter assembly includes a second upper spacer means adjacent to the inner wall of said filter vessel and a second upper bar means extending upwardly from said second upper spacer means to form a second upper pocket between said second upper bar means and the inner wall of said filter vessel around the inner circumference of said filter vessel.

9. The filter vessel of claim 8 wherein said second upper seal assembly comprises a second resilient elastomer ring having a first portion adapted to extend downwardly into said second upper pocket, a second portion extending downwardly from said first portion and located adjacent the inside edge of said second upper bar means, and a lower portion extending from said side portion and located adjacent a lower edge of said second upper spacer means.

10. The filter apparatus of claim 9 wherein the upper edge of said membrane is attached to said lower portion of said second elastomer ring to form an airtight seal therewith.

11. The filter apparatus of claim 8 wherein said second upper spacer means is welded to the inner wall of said filter vessel to form a continuous seal between the second upper spacer means and the inner wall of the filter vessel.

12. The filter apparatus of claim 1
further including a generally cylindrical impervious memberane within said filter vessel,
wherein an upper edge of said membrane is joined to said side portion of said elastomer ring.

13. The filter apparatus of claim 12 including a plurality of elastic bands surrounding said membrane.

14. A filter apparatus comprising
a filter vessel having a top section and a bottom section and a generally cylindrical filter screen joining said top and bottom sections,
a filter media supported on upper and lower seal assemblies on the inside wall of said filter vessel such that said filter media covers a majority of said filter screen,
each of said upper and lower seal assemblies comprising a support member affixed in a sealed manner to the inside wall of said filter vessel forming a pocket extending around the circumference of said inside wall and a resilient ring shaped member having a first portion extending into said pocket and a second portion extending from said first portion and outside of said pocket,
said first portion of said ring shaped member forming a seal aganist said support member and having an edge of said filter media affixed thereto,
a generally cylindrial membrane having its upper edge supported from a seal assembly around the inside wall of said filter vessel,
said membrane extending downwardly into said filter vessel, means comprising elastic straps encircling said membrane for contracting the diameter of said membrane when said filter vessel is unpressurized and for allowing said membrane to expand its diameter to contact with said filter media when said filter vessel is pressurized above the open end of said membrane.

15. The filter apparatus of claim 14 wherein said seal assembly supporting said membrane is located above said upper seal assembly supporting the upper edge of said filter media.

* * * * *